No. 696,249. Patented Mar. 25, 1902.
W. F. MASTERS.
VEHICLE WHEEL.
(Application filed Nov. 16, 1901.)
(No Model.)
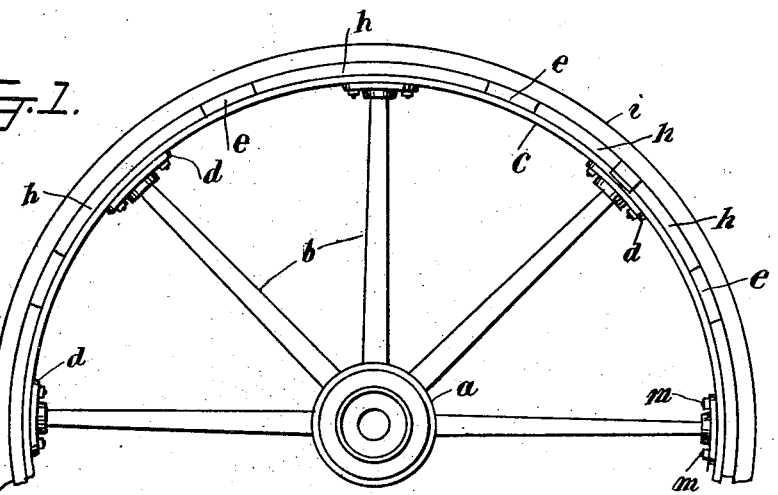
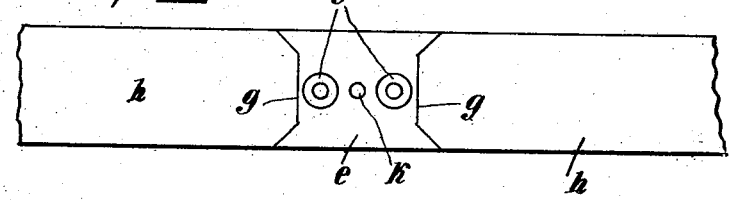
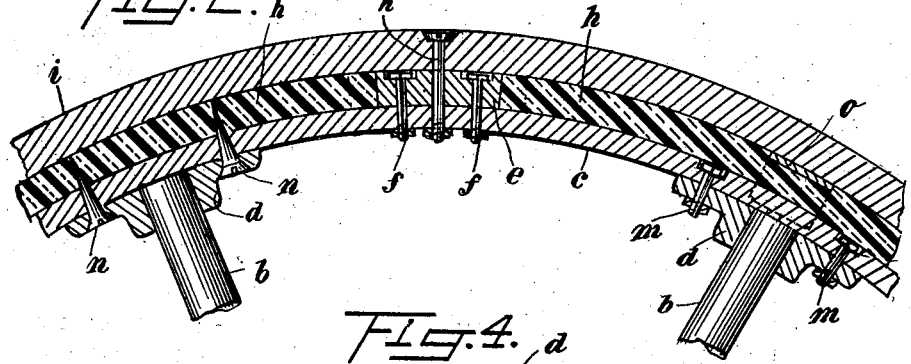
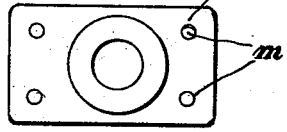
WITNESSES:
F. A. Stewart
F. F. Leeler
INVENTOR
William F. Masters
BY
Edgar Fitch
ATTORNEYS

UNITED STATES PATENT OFFICE.

WILLIAM F. MASTERS, OF BROOKLYN, NEW YORK.

VEHICLE-WHEEL.

SPECIFICATION forming part of Letters Patent No. 696,249, dated March 25, 1902.

Application filed November 16, 1901. Serial No. 82,513. (No model.)

*To all whom it may concern:*

Be it known that I, WILLIAM F. MASTERS, a citizen of the United States, residing at Brooklyn, in the county of Kings and State of New York, have invented certain new and useful Improvements in Vehicle-Wheels, of which the following is a full and complete specification, such as will enable those skilled in the art to which it appertains to make and use the same.

The object of this invention is to provide an improved vehicle-wheel particularly adapted for use in connection with heavy trucks, express-wagons, and similar vehicles, and the tire and rim of which are so formed and constructed as to produce an elastic effect and also deaden the sound produced by the vehicle in passing over rough or stony pavements; and with this and other objects in view the invention consists in a wheel of the class specified constructed as hereinafter described and claimed.

In the drawings forming part of this specification, in which the separate parts of my improvement are designated by the same reference characters in each of the views, Figure 1 is a side view of a part of a wheel constructed according to my invention; Fig. 2, a section through the tire and rim of the wheel; Fig. 3, a view of a portion of the wheel with the tire proper removed, and Fig. 4 an inside view of a device which I employ for connecting the spokes with the rim of the wheel.

In the drawings forming part of this specification I have shown at $a$ the hub of a wheel made according to my invention, and this wheel is provided with the usual spokes $b$, which are connected with a metal or steel rim $c$ by means of thimble-plates $d$, which are secured to said rim, as hereinafter described.

Connected with the rim $c$ at regular intervals and preferably midway between the spokes $b$ are metal blocks $e$, which are secured to the rim $c$ by bolts $f$, which are preferably passed inwardly through said blocks and said rim, and the heads of which are preferably countersunk in said blocks, as shown in Fig. 2, and the opposite sides of said blocks are provided with recesses $g$, and placed between said blocks are strips $h$, composed of rubber and canvas or any suitable elastic material, and secured around the rim $c$, the blocks $e$, and the elastic members $h$ is a band $i$ of steel which constitutes the tire proper, and as thus constructed it will be seen that the metal or steel band $c$ constitutes the rim proper of the wheel, between which and the tire $i$ is placed the elastic member or members $h$.

The outer band or tire $i$ is bolted to the inner parts or members by bolts $k$, passed inwardly therethrough and the heads of which are countersunk in the outer band or tire $i$, as clearly shown in Fig. 2, and in securing the spokes $b$ to the inner band or rim $c$ I may employ bolts $m$, as shown at the right-hand side of Fig. 2, which are passed inwardly through the band or rim $c$ and through the thimble-plates $d$, and the heads of which are countersunk in the band or rim $c$, or I may employ screws $n$, as shown at the left-hand end of Fig. 2, which are passed outwardly through the thimble-plates and through the rim or band $c$ and into the elastic members $h$, this last construction securely holding said elastic members in place. I may also employ clips $o$, which inclose the elastic members and the sides of which overlap the inner rim or band $c$, and other means may be employed, if desired, for holding the elastic members in position; but as a rule the said elastic members are so formed at the ends as to fit into the recesses $g$ in the plates $e$, and when the tire or band $i$ is secured in position the said elastic members will not need any other securing devices.

The wheel rim and tire constructed in this manner possess a large amount of elasticity, and the elastic members $h$ may be so treated that they will not be injuriously affected by moisture, and in addition to possessing the elastic qualities the construction of the wheel is such that the noise produced by a vehicle in passing over rough pavements is reduced to a minimum.

My invention is not limited to the exact construction herein described, and it will be apparent that changes therein and modifications thereof may be made without departing from the spirit of my invention or sacrificing its advantages, and I reserve the right to make all such alterations therein as fairly come within the scope of my invention.

Having thus fully described my invention, what I claim as new, and desire to secure by Letters Patent, is—

1. A wheel, the rim of which is composed of an inner metal band of steel, metal blocks secured to the perimeter thereof at regular intervals, elastic members placed between said blocks, and an outer band or tire proper, secured to and inclosing said blocks and said elastic members, substantially as shown and described.

2. A wheel, the rim of which comprises an inner metal band with which the spokes are connected, metal blocks secured to the perimeter thereof at regular intervals, elastic members placed between said metal blocks, and an outer band or tire proper of metal secured to and inclosing the blocks and elastic members, substantially as shown and described.

3. A wheel, the rim of which is composed of an inner metal band with which the spokes are connected, metal blocks secured to the perimeter of said band between the spokes, elastic members placed between said blocks and inclosing said band, and an outer tire or steel band inclosing said blocks and elastic members and connected therewith by bolts passing through said blocks and said inner band, substantially as shown and described.

4. A wheel, the rim of which consists of a metal band with which the spokes are connected by means of thimble-plates which are secured to the inner surface of said band, blocks secured to the perimeter of said band between the spokes elastic members placed between said blocks and secured to said band and an outer metal band or tire secured to and inclosing said blocks and elastic members by means of bolts passing therethrough and through said blocks, and the inner band, substantially as shown and described.

In testimony that I claim the foregoing as my invention I have signed my name, in presence of the subscribing witnesses, this 13th day of November, 1901.

WILLIAM F. MASTERS.

Witnesses:
   F. A. STEWART,
   F. F. TELLER.